US 6,644,938 B2

(12) United States Patent
Omori

(10) Patent No.: US 6,644,938 B2
(45) Date of Patent: Nov. 11, 2003

(54) TURBO MOLECULAR PUMP

(75) Inventor: Hideki Omori, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/100,750

(22) Filed: Mar. 18, 2002

(65) Prior Publication Data

US 2002/0131877 A1 Sep. 19, 2002

(30) Foreign Application Priority Data

Mar. 19, 2001 (JP) ........................................ 2001-078591

(51) Int. Cl.⁷ ............................. F03B 5/00; F04B 35/04
(52) U.S. Cl. ................... 417/353; 417/44.1; 417/423.4; 415/90
(58) Field of Search .............................. 417/44.1, 353, 417/354, 424.1, 423.4; 415/90

(56) References Cited

U.S. PATENT DOCUMENTS

| | | | |
|---|---|---|---|
| 4,023,920 A | | 5/1977 | Bachler et al. ............. 417/354 |
| 5,350,275 A | * | 9/1994 | Ishimaru ..................... 415/90 |
| 5,618,167 A | * | 4/1997 | Hirakawa et al. ............. 415/90 |
| 5,971,725 A | * | 10/1999 | Simon et al. ............. 417/423.4 |
| 6,398,524 B1 | * | 6/2002 | Taira et al. ............... 417/423.4 |
| 6,419,461 B2 | * | 7/2002 | Okada ..................... 417/423.4 |

FOREIGN PATENT DOCUMENTS

| | | |
|---|---|---|
| EP | 1036951 | 9/2000 |
| JP | 8-338393 | * 12/1996 |
| WO | 9613667 | 5/1996 |

OTHER PUBLICATIONS

Patent Abstracts of Japan vol. 008, No. 274 (M–345) Dec. 14, 1984, publication No. 59144815, publication date Aug. 20, 1984.
Patent Abstracts of Japan, vol. 016, No. 458 (M–1315) Sep. 24, 1992, publication No. 041644171, publication date Jun. 9, 1992.

* cited by examiner

Primary Examiner—Michael Koczo
(74) Attorney, Agent, or Firm—Adams & Wilks

(57) ABSTRACT

The present invention provides a turbo molecular pump capable of suppressing temperature rise in an electronic circuit section within a range, without losing airtight property thereof with a simple construction. In a base section of a turbo molecular pump, a bottom portion thereof is sealed by a bottom cover. A semiconductor device is disposed at the inner portion of the bottom cover. A cooling member is provided, which is used for releasing heat of the semiconductor device in an airtight state outside the bottom cover.

8 Claims, 3 Drawing Sheets

TURBO MOLECULAR PUMP

BACKGROUND OF THE INVENTION

1. Field of the Invention

The present invention relates to a turbo molecular pump, and particularly, to a turbo molecular pump capable of suppressing an electronic circuit section temperature rise in an electronic circuit section within a range required without losing airtight property thereof without a simple construction.

2. Description of the Related Art

As shown in Japanese Patent Application Laid-open No. 2000-240649 as an example in which a turbo molecular pump is constructed with a magnetic bearing of five-shafts control type, magnetic floating of a rotor is made by a high frequency motor and a magnetic bearing to perform high speed rotation support for a rotation blade in a non-contact manner, to thereby exhaust in a vacuum process gas of a semiconductor manufacturing apparatus.

The turbo molecular pump requires to be controlled based on individual parameters (such as specifying a machine model and various properties corresponding to the machine model) each of which undergoes adjustment. The above turbo molecular pump is provided with an electronic circuit section in its main body which is used for storing these control parameters. The electronic circuit section is composed of a semiconductor memory such as an EEP-ROM, an electronic component such as a semiconductor device used for accessing the semiconductor memory and a substrate for mounting the semiconductor memory.

This electronic circuit section is accommodated around the center portion of a base section by which the lower portion of the turbo molecular pump is constructed and is sealed by a bottom cover having airtight property. An exhaust port is formed in the base section.

Incidentally, in the turbo molecular pump, there is a problem in that saturation vapor pressure is exceeded by a discharged gas at the periphery of the exhaust port, and the like, with the result that products are likely to cause solidification or adhesion. In order to solve this problem as a general measure for a reaction product, the base section is heated by a heater or the like so that high temperature is constantly maintained therein.

Accordingly, the electronic circuit section of the base section is exposed to high temperature. Further, in some cases, the temperature of the electronic circuit section exceeds limitation temperature depending on variations of an exhaust load etc., to thereby break a storing means constituted by a semiconductor memory. With the semiconductor memory broken, when data disappearance or data change occurs, magnetic floating is not allowed to be conducted or the number of rotation becomes more than the maximum level to cause a danger.

The present invention is made in view of the above conventional problem, and an object of the present invention is therefore to provide a turbo molecular pump capable of suppressing temperature rise in an electronic circuit section within a range required, without losing airtight property thereof with a simple construction.

SUMMARY OF THE INVENTION

According to a turbo molecular pump of the present invention, the turbo molecular pump is characterized by comprising: a rotor blade; a magnetic bearing means for supporting the rotor blade with magnetic force and adjusting a position of the rotor blade with respect to its radius direction and/or its axial direction; a rotation driving means for conducting rotation driving of the rotor blade; a base section which is disposed at a lower portion of the magnetic bearing means and the rotation driving means and is provided with an exhaust port; a bottom cover equipping therein and for sealing the magnetic bearing means and the rotation driving means at a bottom portion of the base section; a semiconductor device disposed at an inner portion of the bottom cover; a cooling means for releasing to the outside heat of the semiconductor device; and a controlling means for controlling rotation of the magnetic bearing means and the rotation driving means.

The operation of the magnetic bearing means is controlled by the controlling means based on control parameters which are stored in the semiconductor device. The semiconductor device is provided with the cooling device, to thereby to release to the outside heat of the semiconductor device under an airtight state.

Thus, even when temperature rise occurs in the base section, temperature rise is suppressed in the semiconductor device temperature rise, resulting in that the function is maintained and the bearing can be controlled in a stable manner.

Also, according to the turbo molecular pump of the present invention, the turbo molecular pump is characterized in that the semiconductor device is provided with a temperature detecting means for detecting a temperature of the semiconductor device, and the controlling means includes an temperature abnormality detection section by which an alarm is output and an operation is stopped or either of the above processing is carried out, in accordance with a temperature detected through the temperature detecting means.

The above turbo molecular pump is equipped with the temperature detecting means and the temperature abnormality detection section in the semiconductor device, with the result that processing such as an alarm output is made in accordance with a state of the temperature of the semiconductor device. Accordingly, it becomes possible to safely deal with a trouble of the cooling means.

Further, according to the turbo molecular pump of the present invention, the turbo molecular pump is characterized in that the cooling means is disposed outside the semiconductor device so that the bottom cover is interposed there between.

The turbo molecular pump performs heat transfer through the bottom cover, and thus an airtight construction that is specially provided is not necessary and it is possible to cool the semiconductor device with a simple construction.

Still further, according to the turbo molecular pump of the present invention, the turbo molecular pump is characterized in that the cooling means is provided with a heat pipe disposed by piercing the bottom cover and/or the base section, and the semiconductor device is disposed on a heat receiving section of the heat pipe.

The semiconductor device is cooled directly by the heat pipe. Also, with a piercing portion of the heat pipe having a relatively small diameter, processing for making an airtight state can be easily conducted. Therefore, the simple construction enables the semiconductor device to be intensively cooled in an effective manner without losing airtight property.

DESCRIPTION OF THE PREFERRED EMBODIMENT

Figure 1:
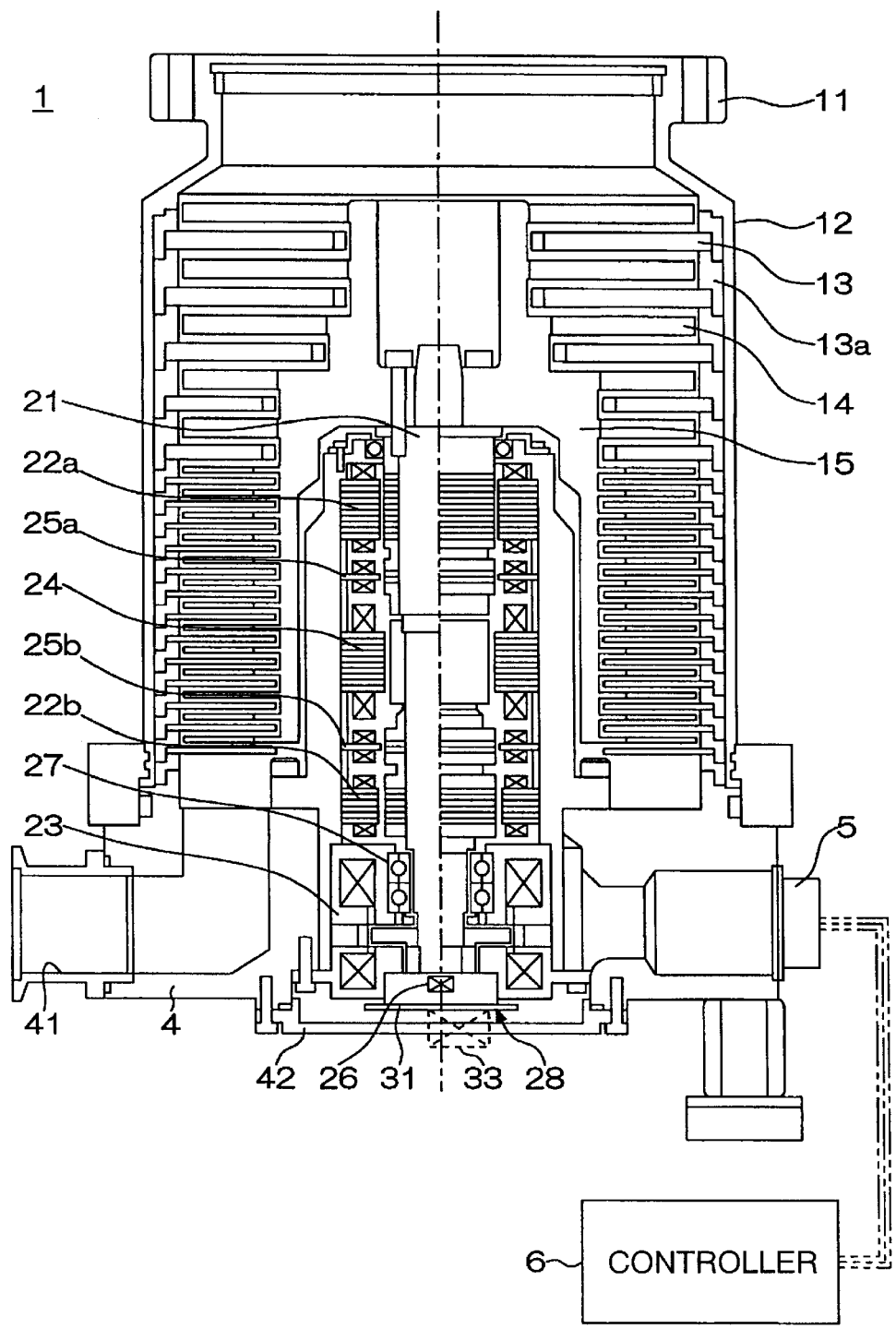
FIG. 1 is a sectional view showing a turbo molecular pump according to a first embodiment of the present invention.

Embodiments of the present invention will be described below. FIG. 1 is a sectional view showing a turbo molecular pump 1 of First embodiment of the present invention.

In FIG. 1, a turbo molecular pump 1 is composed of: a stator blade 13 which is constructed with multi layers through a spacer 13a in an outer housing 12 that is formed into a substantially cylindrical shape; a rotor main body 15 for supporting a rotor blade 14 that is constructed with multi layers so as to face the stator blade 13; a controller 6 connected thereto through a connector 5 that is equipped inside a base section 4 of a lower portion, and the like. A suction side flange 11 is formed on an upper end of the outer housing 12.

The rotor main body 15 includes a rotor shaft 21 serving as a center shaft. In the rotor shaft 21, a thrust magnetic bearing 23 is provided for performing floating support, by which floating support is carried out with respect to a radial magnetic bearing 22a that is disposed at an upper side thereof, a radial magnetic bearing 22b that is disposed on a lower side thereof and a lower end of the rotor shaft 21.

Also, the rotor shaft 21 includes: a radial sensor of the upper side 25a which is arranged so as to correspond to the radial magnetic bearing 22a of the upper side; a radial sensor 25b of the lower side which is arranged so as to correspond to the radial magnetic bearing 22b of the lower side; an axial sensor 26 corresponding to the thrust magnetic bearing 23; and a bearing 27 for protection which is equipped inside the thrust magnetic bearing 23, as well as a motor 24 for driving rotation thereof.

A base section 4 has a substantially ring shape, and an exhaust port 41 is formed at a side portion thereof. Also, an electronic circuit section 28 is equipped inside at the periphery of the center in the lower surface of the base section 4. A bottom cover 42 is attached in an airtight state such that the electronic circuit section 28 is covered.

In the electronic circuit section 28, a semiconductor device 32 and other electronic components are mounted on a substrate 31 which is attached to the lower end of the thrust magnetic bearing 23. The semiconductor device 32 includes: a semiconductor memory such as an EEP-ROM, in which specifying of the machine model, various properties corresponding to the machine model, control parameters an the like are stored; and a semiconductor device that is used for data access. The semiconductor device 32 is provided with a cooling member 33.

The connector 5 relays respective leads which are included in each of the sensors 25a, 25b and 26 and the electronic circuit section 28 as well as those in the motor 24 and each of the magnetic bearings 22a, 22b and 23. Through the connector 5, each of the members is detachably connected with the controller 6.

Figure 2:
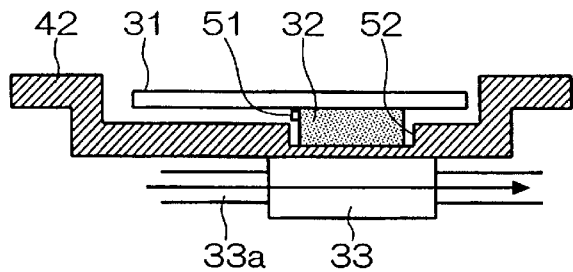
FIG. 2 is an enlarged sectional view showing a configuration of an electronic circuit section of the turbo molecular pump illustrated in FIG. 1.

FIG. 2 is an enlarged sectional view showing the construction of the electronic circuit section of the turbo molecular pump indicated in FIG. 1.

The semiconductor device 32 of the electronic circuit section 28 is fixed to a recess section 52 that is formed on the bottom cover 42 by using a thermal conductivity adhesive. Also, a temperature detector that is constituted by a temperature sensor 51 such as a thermistor is attached to the side portion of the semiconductor device 32.

The bottom cover 42 is formed of a material such as metal which exhibits high thermal conductivity, and a cooler of a water cooling system which consists of a cooling member 33 with a cooling water pipe 33a, is provided on the lower surface thereof. The cooling member 33 is disposed in the vicinity of the semiconductor device 32 with the bottom cover 42 interposed there between.

The temperature sensor 51 is connected with the controller 6 through the connector 5. The controller 6 includes an temperature abnormality detection section 6a which performs processing for outputting an alarm etc. in accordance with a temperature detected by the temperature sensor 51. Further, the temperature abnormality detection section 6a is constructed such that set processing is carried out as needed, such as controlling the turbo molecular pump 1 so that the operation thereof is stopped.

Next, the operation of the turbo molecular pump according to a first embodiment of the present invention will be described.

Airtight property of the electronic circuit section 28 is secured by the bottom cover 42. Also, the semiconductor device 32 is intensively cooled by the cooling member 33 through the bottom cover 42. Therefore, when the base section 4 is heated to cause temperature rise, temperature decrease is not induced in the vicinity of the exhaust port 41 and only the semiconductor device 32 of the electronic circuit section 28 is intensively cooled.

At this time, even when the base section 4 is subjected to much higher temperature rise due to variations of an exhaust load and the like, the temperature change of the semiconductor device 32 is suppressed to a small extent by the cooling member 33. Thus, even in an environment where the inside of the base section 4 is high in temperature, temperature rise is suppressed in the semiconductor memory such as an EEP-ROM and the semiconductor device 32 such as an IC used for accessing data and the functions thereof are maintained.

The control parameters stored in the semiconductor device 32 is referred by the controller 6. The cooling member 33 makes it possible that the controller 6 reads out the control parameters from the electronic circuit section 28 in a stable manner.

The machine model of the magnetic bearing main body and a data abnormality are checked by these control parameters. When verifying that the data is normal, the parameters for controlling the magnetic bearing main body are automatically confirmed and adjusted.

In the case of a magnetic bearing of five-shafts control type, the radial magnetic bearing of the upper side 22a, the radial magnetic bearing of the lower side 22b and the thrust magnetic bearing 23 are controlled based on control parameters peculiar to each of the bearings, to thereby perform magnetic floating support of the rotor shaft 21.

In the radial magnetic bearing of the upper side 22a, excitation control regarding the two shafts orthogonal to each other is conducted based on signals of the radius direction position, which is detected by the radial sensor of the upper side 25a, by a compensation circuit which has a PID adjustment function. Similarly, in the radial magnetic bearing of the lower side 22b, excitation control regarding the two shafts orthogonal to each other is conducted based on signals of the radial sensor of the lower side 25b.

In the thrust magnetic bearing 23, excitation control is performed based on signals from the axial sensor 26 in an axial direction, and also the rotation thereof is controlled by control parameters in accordance with the load of the motor 24 or the like.

Thus, it is realized that the turbo molecular pump 1 rotates at high speed based on the control parameters which are stored in the electronic circuit section 28, to thereby perform exhaust operation in a stable manner.

Next, the description will be made of the case in which the cooling member 33 does not function due to a trouble and the like or degradation of the functions thereof occurs.

Due to stop of cooling water and the like, the cooling member 33 does not function. Alternatively, heat discharge is not conducted in the case where the functions are degraded, resulting in that heat received from the base section 4 is accumulated, to thereby rise the temperature of the semiconductor device 32. In this case, the temperature sensor 51 outputs a signal in accordance with the temperature. The signal is transferred to the temperature abnormality detection section 6a of the controller 6 through the connector 5.

Figure 3:
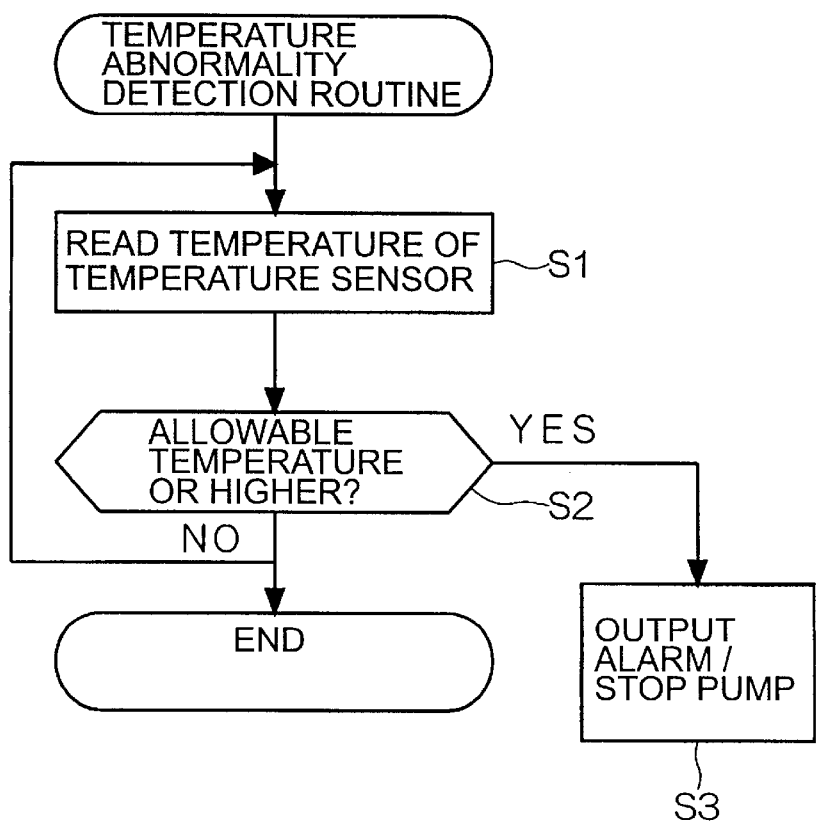
FIG. 3 is a flow chart showing a processing procedure of an temperature abnormality detection section.

FIG. 3 is a flow chart showing a processing procedure of the temperature abnormality detection section 6a.

While the turbo molecular pump 1 is operated, the current temperature of the temperature sensor 51 is stored at Step 1 (it is referred to as "S1" in the drawing. Hereinafter, the same is applied.) As long as the temperature falls within a range of set temperature, at Step 2, the temperature of the semiconductor device 32 is always monitored by returning to Step 1. When exceeding the set temperature, at Step 3, an alarm is output and a processing is conducted in response to the set function for stopping the operation.

Accordingly, the operation of the turbo molecular pump 1 is stopped in a safe manner within a range allowing normal operation of the semiconductor device 32. Additionally, when the alarm is output, it becomes possible for an operator to perceive the presence of temperature abnormality in the semiconductor device 32.

Figure 4:
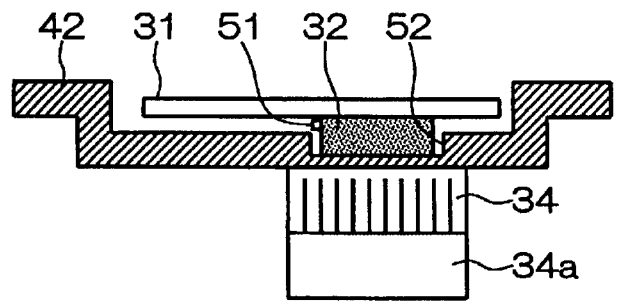
FIG. 4 is an enlarged sectional view showing a configuration of an electronic circuit section of a turbo molecular pump according to a second embodiment of the present invention.

Next, a second embodiment of the present invention will be described. FIG. 4 is an enlarged sectional view showing a construction of an electronic circuit section of a turbo molecular pump 1 according to the second embodiment of the present invention. Note that the same reference numerals will be used to designate the same components as those in FIG. 2, and the description thereof will be omitted.

At the lower surface of the bottom cover 42 in FIG. 4, a heat release fin 34 is disposed instead of using the cooler of a water cooling system of the turbo molecular pump according to the first embodiment. The heat release fin 34 is provided with a fan 34a and constitutes a cooler of a forced-air cooling system.

According to such a configuration, the cooling water pipe 33a is not necessary, with the result that it is possible to construct the turbo molecular pump 1 more compactly than the cooler of a water cooling system according to the first embodiment. Also, in a similar manner to First embodiment, it becomes possible to intensively cool the semiconductor device 32 under an airtight state.

Figure 5:
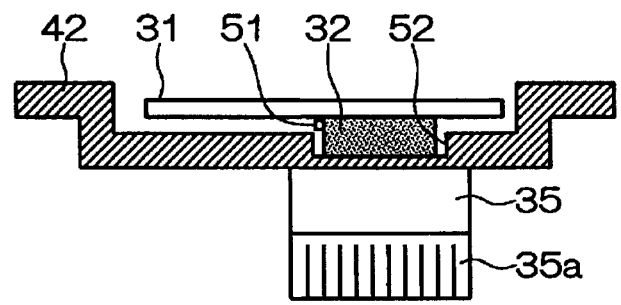
FIG. 5 is an enlarged sectional view showing a configuration of an electronic circuit section of a turbo molecular pump according to a third embodiment of the present invention.

Next, a third embodiment of the present invention will be described. FIG. 5 is an enlarged sectional view showing a construction of an electronic circuit section of a turbo molecular pump 1 according to the third embodiment of the present invention. Note that the same reference numerals will be used to designate the same or similar components as those in FIG. 2, and the description thereof will be omitted.

At the lower surface of the bottom cover 42 in FIG. 5, a cooler that is constituted by a peltier element 35 is disposed instead of using the cooler of a water cooling system of the turbo molecular pump 1 according to the first embodiment. A low-temperature side of the peltier element 35 is in contact with the bottom cover 42 to be attached thereto and a heat release fin 35a is provided at a high-temperature side thereof.

According to such a configuration, in a similar manner to the second embodiment, the cooling water pipe 33a is not necessary, with the result that it is possible to construct the turbo molecular pump 1 more compactly. Also, in a similar manner to the first embodiment, it is possible to intensively cool the semiconductor device 32 under an airtight state.

Figure 6:
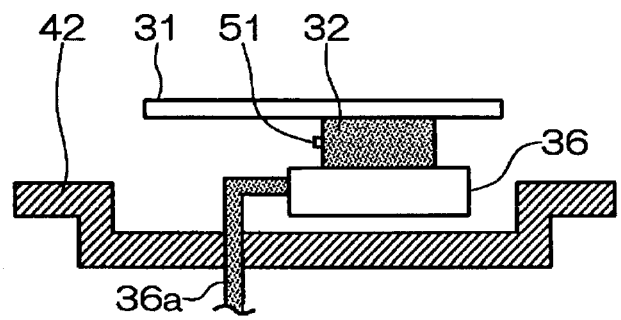
FIG. 6 is an enlarged sectional view showing a configuration of an electronic circuit section of a turbo molecular pump according to a fourth embodiment of the present invention.

Next, a fourth embodiment of the present invention will be described. FIG. 6 is an enlarged sectional view showing a construction of an electronic circuit section of a turbo molecular pump 1 according to the fourth embodiment of the present invention. Note that the same reference numerals will be used to designate the same components as those in FIG. 2, and the description thereof will be omitted.

In FIG. 6, a cooler of a heat pipe system, which is composed of: a pipe section 36a disposed piercing a bottom cover 42; and a heat receiving section 36 arranged at the tip end thereof, is constructed for the semiconductor device 32. The heat receiving section 36 is attached directly to the semiconductor device 32 with a thermal conductivity adhesive or the like.

According to such a construction, the heat receiving section 36 allows direct cooling performed for the semiconductor device 32 in the bottom cover 42. Further, the pipe section 36a having a relatively small diameter is fixed with adhesive or the like, with the result that airtight property in the bottom cover 42 is easily ensured.

Therefore, with the cooler of a heat pipe system according to Fourth embodiment, without losing airtight property in the bottom cover 42, it is possible to intensively cool the semiconductor device 32 that is an object of cooling in an effective manner. Note that, the piercing position of the pipe section 36a may be appropriately selected among any one of the positions in addition to the bottom cover 42, such as the base section 4, in accordance with the position of the semiconductor device 32.

As described above, according to the present invention, an electronic circuit section includes a cooling means, whereby heat in a semiconductor device is released outside a bottom cover under an airtight state. That is, only the semiconductor device of the electronic circuit section is intensively cooled.

Therefore, even in the case where temperature rise occurs in a base section, temperature rise is suppressed in the semiconductor device to maintain its functions, whereby a stable control of bearings becomes possible.

Additionally, when attaching a temperature sensor to the semiconductor device, a temperature abnormality in the semiconductor device is detected by outputting an alarm, and further it allows one to take a measure beforehand such as stopping the operation in a safe manner, and the like.

What is claimed is:

1. A turbo molecular pump comprising:
   a rotor blade;
   a magnetic bearing means for supporting the rotor blade with magnetic force and adjusting a position of the rotor blade with respect to its radius direction and/or its axial direction;
   a rotation driving means for conducting rotation driving of the rotor blade;
   a base section disposed at a lower portion of the magnetic bearing means and the rotation driving means and provided with an exhaust port therein;
   a bottom cover for equipping therein and sealing the magnetic bearing means and the rotation driving means at a bottom portion of the base section;
   a semiconductor device disposed at an inner portion of the bottom cover;
   a cooling means for releasing to the outside heat of the semiconductor device; and
   a controlling means for controlling rotation of the magnetic bearing means and the rotation driving means.

2. A turbo molecular pump according to claim 1; wherein the semiconductor device is provided with temperature detecting means for detecting a temperature of the semiconductor device; and the controlling means includes a temperature abnormality detection section for outputting an alarm in accordance with a temperature detected by the temperature detecting means.

3. A turbo molecular pump according to claim 1; wherein the semiconductor device is provided with temperature detecting means for detecting a temperature of the semiconductor device; and the controlling means includes a temperature abnormality detection section for stopping an operation in accordance with a temperature detected by the temperature detecting means.

4. A turbo molecular pump according to claim 1; wherein the semiconductor device is provided with a temperature detecting means for detecting a temperature of the semiconductor device; and the controlling means includes a temperature abnormality detection section for outputting an alarm and stopping an operation in accordance with a temperature detected by the temperature detecting means.

5. A turbo molecular pump according to claim 1; wherein the cooling means includes a cooling water pipe disposed outside the semiconductor device with the bottom cover interposed therebetween.

6. A turbo molecular pump according to claim 1; wherein the cooling means includes a heat release fin disposed outside the semiconductor device with the bottom cover interposed therebetween.

7. A turbo molecular pump according to claim 1; wherein the cooling means includes a Peltier element disposed outside the semiconductor device with the bottom cover interposed therebetween.

8. A turbo molecular pump according to claim 1; wherein the cooling means includes a heat pipe extending through the bottom cover and/or the base section, and the semiconductor device is disposed on a heat-receiving section of the heat pipe.

* * * * *